United States Patent [19]

Shelley

[11] Patent Number: 4,987,513

[45] Date of Patent: Jan. 22, 1991

[54] APPARATUS AND METHOD FOR SELECTIVELY DELAYING THE CONNECTION OF AN ELECTRICAL SUPPLY VOLTAGE TO AN ELECTRICAL LOAD

[76] Inventor: Edwin F. Shelley, 339 Oxford Rd., New Rochelle, N.Y. 10804

[21] Appl. No.: 337,558

[22] Filed: Apr. 12, 1989

[51] Int. Cl.[5] .............................................. H02H 3/24
[52] U.S. Cl. ........................................ 361/92; 361/59; 361/89
[58] Field of Search ....................... 361/89, 92, 59, 75, 361/195, 74, 86, 87, 90; 340/662

[56] References Cited

U.S. PATENT DOCUMENTS

| | | | |
|---|---|---|---|
| 4,117,526 | 9/1978 | Bates | 361/92 |
| 4,331,996 | 5/1982 | Matsko et al. | 361/92 |
| 4,356,526 | 10/1982 | Russell | 361/59 |
| 4,412,267 | 10/1983 | Hansen | 361/92 |
| 4,855,862 | 8/1989 | Wainio et al. | 361/92 |

Primary Examiner—Todd E. Deboer
Attorney, Agent, or Firm—Kenyon & Kenyon

[57] ABSTRACT

An apparatus and method for delaying the reconnection of an electrical supply voltage to an electrical load when the supply voltage has been restored after an interruption. In its basic form, the apparatus comprises a circuit interrupter coupled between the network and the load for disconnecting the load from the network when the supply voltage has been interrupted and a sensing circuit coupled to the circuit interrupter and to the supply network for sensing when the supply voltage has been restored and for actuating the circuit interrupter to reconnect the supply and the load at a first predetermined time delay after the supply voltage has been restored. In additional embodiments, the apparatus prevents the disconnection of the network from the load during momentary interruptions of power for less than a specified amount of time, and a power saver circuit may be employed to conserve power, especially if electromechanical relays and power contactors are employed to realize parts of the apparatus.

24 Claims, 2 Drawing Sheets

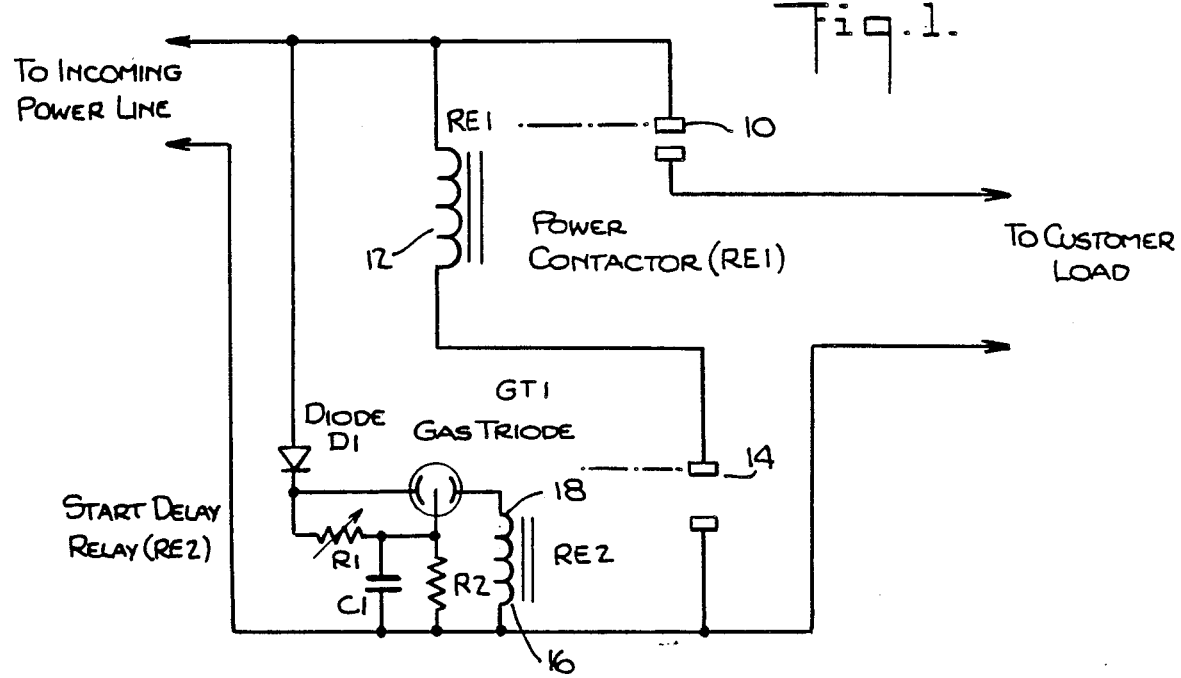
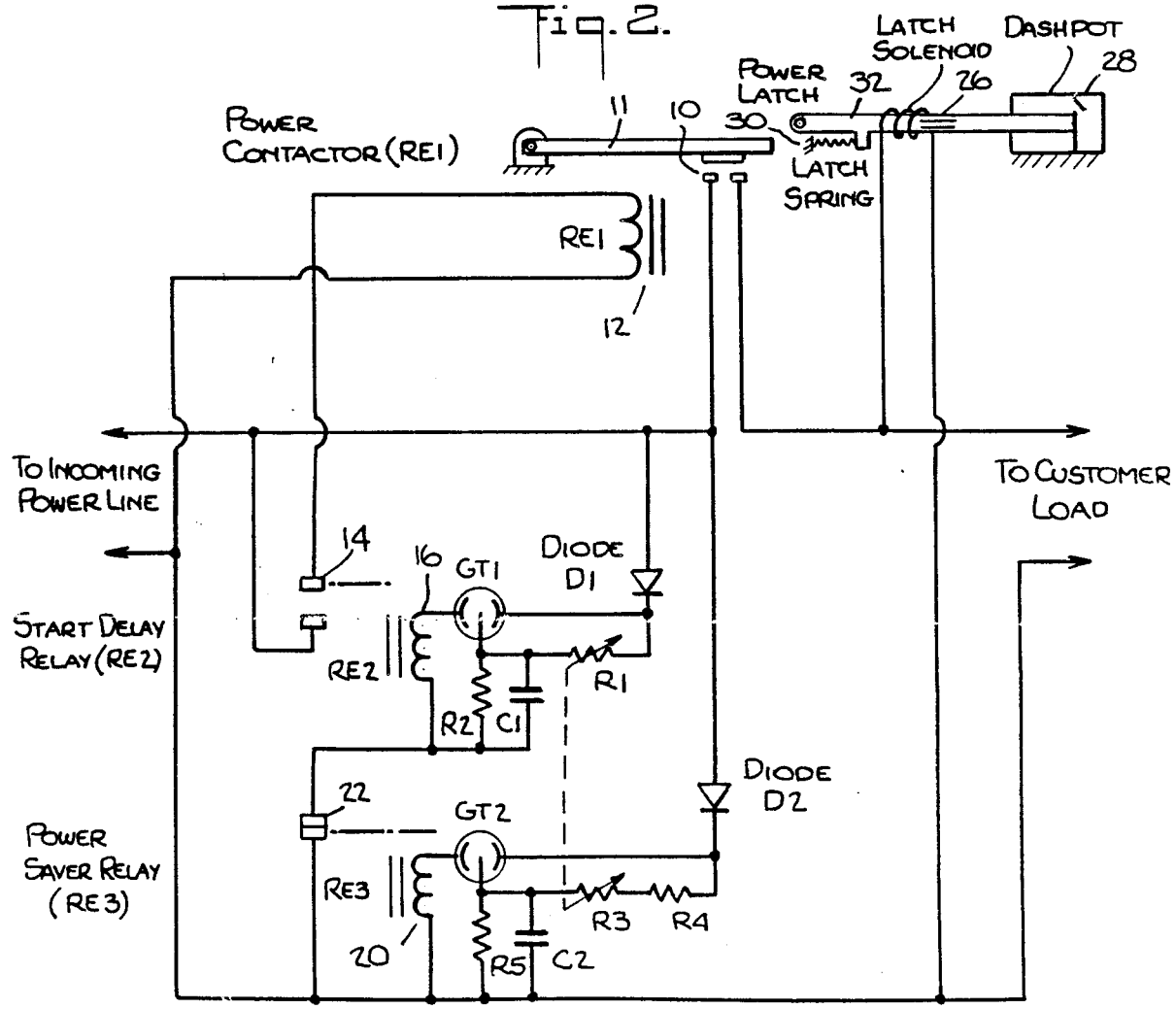

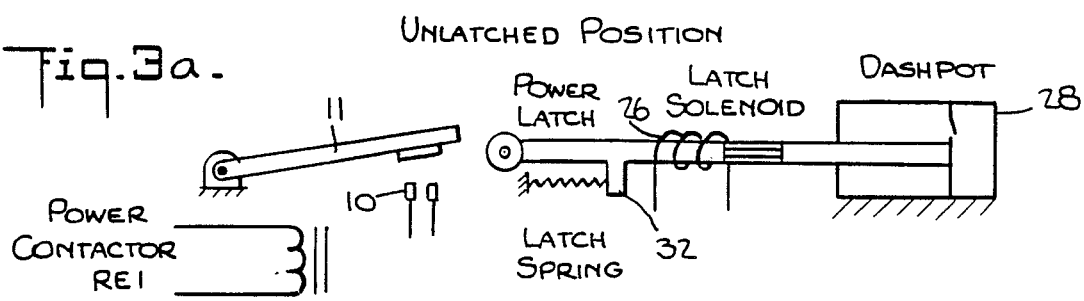
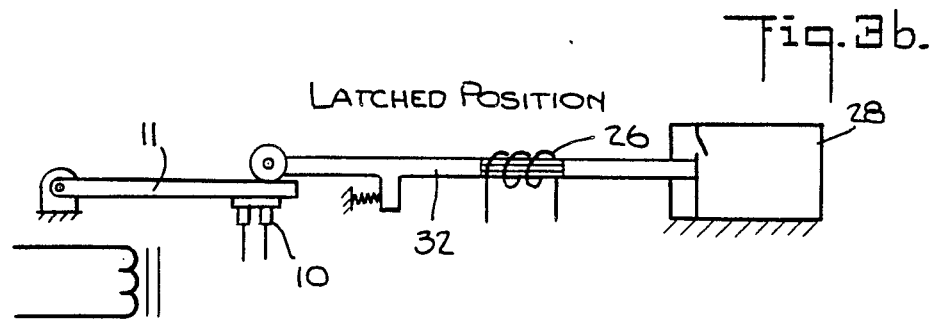
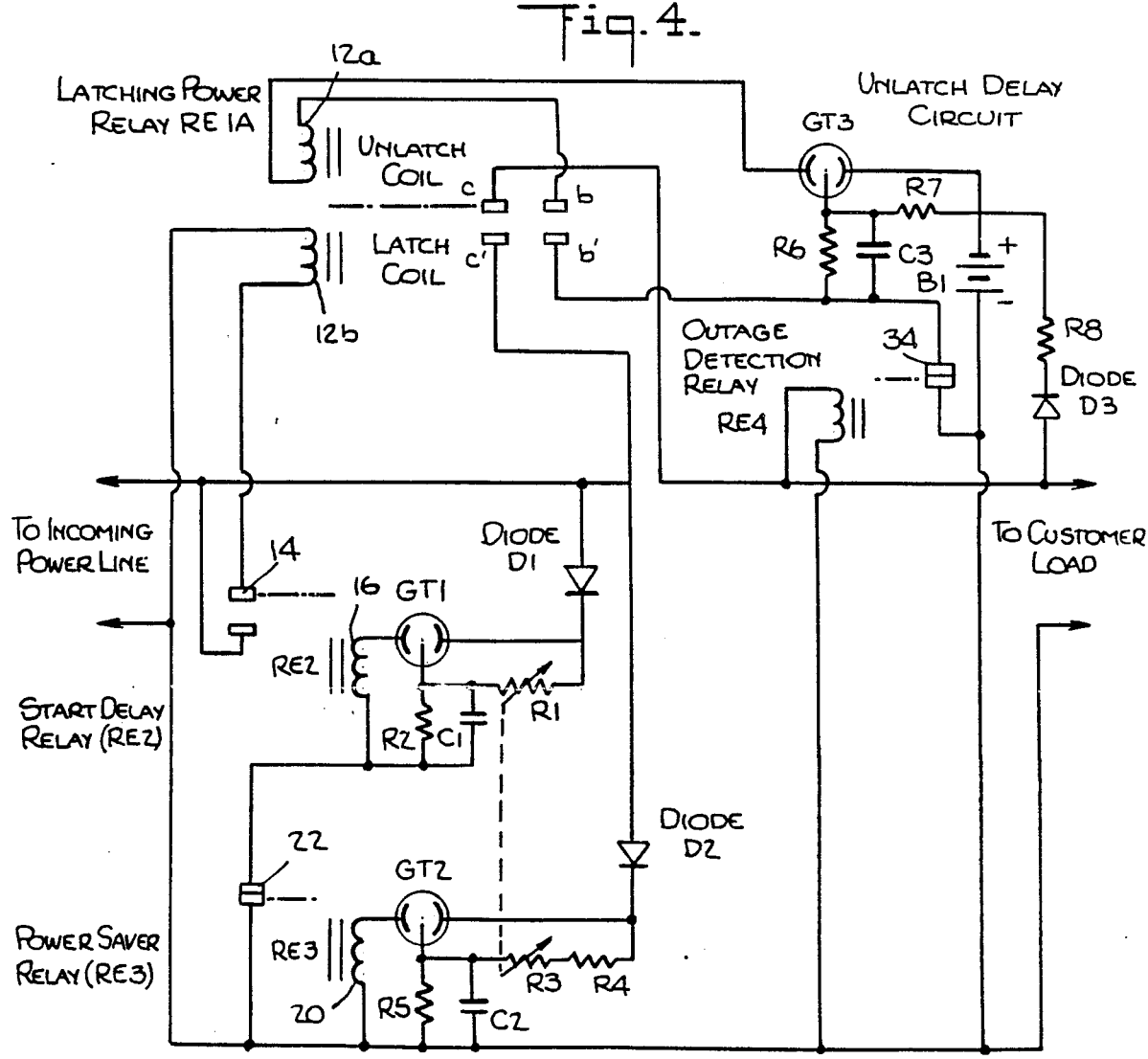

APPARATUS AND METHOD FOR SELECTIVELY DELAYING THE CONNECTION OF AN ELECTRICAL SUPPLY VOLTAGE TO AN ELECTRICAL LOAD

BACKGROUND OF THE INVENTION

The present invention relates to apparatus for connecting an electrical supply voltage to an electrical load, and in particular, to a device for automatically delaying the connection of an electrical supply voltage to an electrical load when the supply voltage has been restored after an interruption. The apparatus of the present invention makes provision for eliminating the delay if the interruption is only momentary. I also call the apparatus of the present invention an "Automatic Cold Start Randomizer", since it allows for effectively randomizing the time of reconnection of various electrical loads to an electrical supply voltage after a power interruption.

A major problem for public utility power companies is the sudden in-rush of demand on its generators when a broken power line or other fault is repaired and the entire electrical load of all the affected customers is suddenly imposed on the utility through the repaired fault. Utility companies call this occurrence a "cold start".

It is, therefore, desirable to apply the load gradually after a fault is repaired by staggering the reconnection between groups of customers and the power line. This can be accomplished by delaying the reconnection of each customer or group of customers by a different amount of time. Thus, for example, 5% of the customers might be reconnected in 10 seconds, 5% more in 20 seconds, 5% more in 30 seconds, and so on until all customers have been connected after 200 seconds This may be called "randomizing" the load reconnection after a cold start. In the past, this has been done manually by throwing circuit breakers or switches connected to the affected loads. This may require the dispatch of workmen to various locations in order to throw the affected circuit breakers or switches, a time-consuming and expensive task.

SUMMARY OF THE INVENTION

According to the invention, however, randomizing or selective delayed reconnection can be accomplished automatically if each customer or group of customers is equipped with a device which recognizes the occurrence of a power outage, and which thereupon disconnects the customers' electrical system from the incoming electrical supply line and then thereafter recognizes the subsequent restoration of power on the supply line, but delays by a chosen amount of time, the reconnection of the customers, system to the supply line.

Each customer or group of customers on the power grid can be equipped with such a device, and for example, 5% of the customers would be equipped with the device having a delay time of 10 seconds, 5% with a delay time of 20 seconds, 5% with a delay time of 30 seconds, and so on. Thus the application of load after a cold start would automatically be spread out over 200 seconds. Other delay times and other percentages of load reconnected after each delay interval can be chosen to suit the requirements of each power company.

Accordingly, it is an object of the present invention to provide an automatic cold start randomizer which delays the connection of a supply voltage to an electrical load when the supply voltage has been restored after an interruption.

It is a further object to provide such an automatic cold start randomizer which provides for selective delay times for reconnection of the load to the supply.

It is yet still a further object of the present invention to provide such an automatic cold start randomizer which can be adjusted for various amounts of delay time as required by the power company and/or the load.

It is a further object of the present invention to provide such an automatic cold start randomizer which prevents disconnection for momentary power outages of less than a specified time.

It is furthermore an object of the present invention to provide such an automatic cold start randomizer which accomplishes the recited function with a minimal amount of hardware through components readily available to the power industry.

The above and other objects of the invention are achieved by an apparatus coupled between an electrical supply network and an electrical load for delaying the connection of the supply network to the load when the supply voltage has been restored after a supply voltage interruption comprising circuit interruption means coupled between the network and the load for interrupting the circuit between the network and the load when the supply voltage has been interrupted, and means coupled to the circuit interruption means and to the supply network for sensing when the supply voltage has been restored and for actuating the circuit interruption means to reconnect the supply and the load at a first predetermined time delay after the supply voltage has been restored.

In various embodiments of the invention, circuits are provided to conserve power in the apparatus according to the invention. For example, embodiments are provided in which a power saver circuit disconnects the energizing coils of the main power contactor relay and a start delay relay. Furthermore, provision is made to prevent disconnection of the load and supply network for only momentary power outages.

Other objects, features and advantages of the present invention will be apparent from the detailed description which follows.

BRIEF DESCRIPTION OF THE DRAWINGS

The invention will be described in greater detail in the following detailed description with reference to the drawing figures in which:

FIG. 1 shows the basic design of a cold start delay circuit according to the invention;

FIG. 2 shows a further embodiment of the cold start delay circuit including a power saver and delayed power disconnect device;

FIG. 3 shows the power contactor latching mechanism with delayed unlatch provision of FIG. 2 in more detail; and FIG. 4 shows another embodiment of an automatic cold start delay circuit according to the invention having another embodiment of a delayed power disconnect circuit.

DETAILED DESCRIPTION

With reference now to the drawings, FIG. 1 shows the basic arrangement for the cold start delay circuit according to the invention. The customer's load is connected to the incoming power line through the normally open contacts 10 of power contactor RE1. The energizing coil 12 of contactor RE1 is connected to the incoming power line through normally open contacts 14 of a start delay relay RE2. The energizing coil 16 of relay RE2 is connected to the incoming power line through a diode rectifier D1 and a gas triode GT1 which is nonconducting when its trigger electrode T is at the same potential as its cathode 18, a situation which exists wherein there is no voltage on the incoming power line. A timing circuit comprising a resistor R1 which may be a variable resistor and a capacitor C1 are connected to the trigger of the gas triode GT1 as shown. Furthermore, a bleeder resistor R2 is connected to the trigger electrode T as shown.

When a power outage drops the incoming power line voltage toward zero the power contactor RE1 opens and disconnects the cutomer's load circuit from the incoming power line. Start delay relay RE2 also opens as capacitor $C_1$ discharges through bleeder resistor R2. When power is restored to the incoming power line, the capacitor $C_1$ charges to positive levels through timing resistor $R_1$ and diode $D_1$ until the voltage across capacitor $C_1$ triggers the gas triode GT1 and the energizing coil of relay RE2 again becomes energized and closes the normally open contacts 14 and allows current to flow through the coil 12 of power contactor RE1, thus closing its contacts after a time delay preset by the timing circuit $R_1C_1$ and reconnecting the customer's load to the incoming power line.

The time constant $R_1C_1$ can be adjusted via variable resistor $R_1$ to trigger the gas triode GT1, and hence energize relay RE2, at different times for different customers after power has been restored following a power outage, thus accomplishing the desired "randomizing" of the load reconnection after a cold start.

The basic start delay circuit of FIG. 1 consumes appreciable power in the energizing coils of power conctactor RE1 and relay RE2 as long as power is available through the incoming line. Furthermore, a momentary power outage such as that caused, for example, by a lightning strike on a power line, would result in delays in restoring power to various customers, which delays may not be necessary to protect the utility's generators and therefore may be undesirable. Furthermore, such unnecessary disconnections for momentary power outages would also be inconvenient for the electrical consumers.

The circuit of FIG. 2 shows one way in which power consumption can be minimized and momentary power outages of less than a certain time can be ignored, i.e., power disconnection is prevented for only momentary outages.

With reference to FIG. 2, when power is restored after a significant outage, the energizing coil 16 of contactor RE2 is energized after the chosen delay imposed by $R_1C_1$ and power contactor RE1 is thereby closed, thus restoring power to the customer's load. Shortly after relay RE2 is energized, a power saver relay RE3 having normally closed contacts 22 opens the energizing coil of relay RE2, which in turn opens the energizing coil of contactor RE1. The contacts of power contactor RE1 remain closed by a power latch, to be described below. This de-energizing of the energizing coils of contactor RE1 and relay RE2 is accomplished through a time delay circuit comprising resistors $R_3$ and $R_4$ and capacitor $C_2$ coupled to the energizing coil of contactor RE3. The timing circuit comprising resistors $R_3$ and $R_4$ and capacitor $C_2$ is similar to the timing circuit connected to relay RE2 but in the exemplary embodiment contains an additional resistor $R_4$ which makes the time constant $(R_3+R_4) C_2$ slightly longer than $R_1C_1$. A single resistor may be employed in place of resistors $R_3$ and $R_4$ so long as the time constant of the delay circuit is longer than that of the delay circuit connected to relay RE2.

Thus, when power is restored after an outage, only the energizing coil of RE3, a low power relay, remains energized after the momentary energizing of the energizing coils of relay RE2 and contactor RE1. A gas triode GT2 may be employed as a triggering mechanism for power saver relay RE3 and a bleeder resistor $R_5$ is provided as shown.

In order to keep the contacts 10 of power contactor RE1 closed after its momentary energization, a power latch is inserted against the contactor armature 11 by a latch solenoid 26 which is energized by the power line when the power contactor contacts 10 close. See also FIG. 3. The latch solenoid 26 remains energized as long as incoming power is available, but the latch mechanism can be designed so that very little power is consumed by the latch solenoid 26. A simple form of power contactor and latch mechanism is shown in FIG. 2 and FIG. 3 as an example, although many other forms may be used. A dashpot mechanism 28 is shown in FIGS. 2 and 3. The dashpot mechanism 2 offers little resistance to movement of the latch when the latch solenoid is energized, but momentarily delays the release of the latch by a latch spring 30 when the incoming power fails, thus preventing the power contactor from opening when a momentary power failure occurs, as for instance, that caused by a lightning strike on a power line. The dashpot mechanism 28 shown is one type of mechanism which can be used to momentarily delay the release of the latch. Other types of mechanisms which may be suitable include mechanical escapements and bi-metallic elements. Furthermore, suitable electrical and electronic components may also be utilized, for example, RC circuits which delay the de-energization of latch solenoid 26 and thus the opening of the contacts upon momentary power outages.

FIG. 3(a) shows the unlatched position of the power latch for latching the armature of power contactor RE1 and FIG. 3(b) shows the latched position wherein the latch solenoid 26 has moved the power latch rod 32 so that it maintains the armature 11 of the power contactor RE1 in a position such that contacts 10 remain closed.

FIG. 4 illustrates an alternative embodiment of a cold start randomizer circuit including a circuit for delaying the release of the power contactor in order to guard against disconnection of customer load in the event of a momentary interruption of power. In FIG. 4, the power contactor RE1 of FIG. 2 is replaced by a conventional latching relay RE1A and the power latch and dashpot arrangement of FIG. 2 are replaced by a battery powered unlatch delay circuit comprising a gas triode GT3 in series with a rechargeable battery B1 and the unlatch coil 12a of contactor RE1A, together with a timing circuit comprising resistor $R_7$ and capacitor $C_3$ which delays the energizing of the unlatch coil 12a for a brief period after an outage detection relay RE4 detects the loss of power at the incoming power line. An additional set of contacts b-b' are also provided on contactor RE1A, to be described below. The main contacts connecting the load and network are denoted a-a'.

When a momentary loss of power occurs, the outage detection relay RE4 drops out and its normally closed contacts 34 connect the battery B1 to the unlatch coil 12a through contacts b-b' of relay RE1A and gas triode GT3 which does not conduct battery current to the unlatch coil of RE1A until after capacitor $C_3$ has charged sufficiently through resistor $R_7$. Thus, after a momentary delay proportional to the time constant $R_7C_3$, the power relay RE1A is unlatched when unlatch coil 12a is energized and the customer load is therefore disconnected from the incoming power line by the opening of contacts a-a'. The unlatch coil 12a is thereafter disconnected from the battery by the opening of contacts b-b'.

If the momentary power interruption is shorter than the unlatch delay time imposed by the time constant $R_7C_3$, the power relay RE1A will not unlatch because the outage detection relay RE4 will become energized upon restoration of power and will open the battery circuit to the power unlatch coil 12a before the unlatch coil has been energized by the battery. If the power interruption is longer than the unlatch delay time, the relay RE1A will unlatch and disconnect the customer load When the incoming power is restored, the latch coil $R_6$ of RE1A is energized through start delay relay RE2 after the selected delay time imposed by $R_1C_1$, as previously described, and the outage detection relay RE4 is energized, thus opening the battery circuit to the unlatch coil 12a of RE1A and preparing conditions for momentarily delaying unlatching RE1A at the next power interruption.

Power saver relay RE3 functions to disconnect the supply from start delay relay RE2 coil 16 and latch coil 12b, as explained with reference to the circuit of FIG. 2. Rechargeable battery B1 is normally kept charged by the power line through diode D3 and limiting resistor $R_8$. Capacitor $C_3$ is normally kept discharged by bleeder resistor $R_6$. The only steady state power consumed by the embodiment of FIG. 4 is that consumed by outage detection relay RE4 and power saver relay RE3, which can be low current devices.

While relays and other discrete components have been used to illustrate the invention disclosed here, it is clear that various of the components can be replaced by integrated circuits, transistors, solid state relays or other solid state components. Furthermore, the trigger devices shown may be replaced with other known triggering devices, such as circuits employing zener diodes or other solid state threshold devices. As would be clear to a person of skill in the art, the electromechanical contactors and relays shown in the drawings can be replaced by other switching devices, e.g., solid state switches.

In the foregoing specification, the invention has been described with reference to specific exemplary embodiments thereof It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus coupled between an electrical supply network and an electrical load for delaying the connection of the supply network to the load when the supply voltage has been restored after a supply voltage interruption or reduction comprising:

circuit interruption means coupled between the network and the load for interrupting the circuit between the supply network and the load when the supply voltage has been interrupted or reduced; and means coupled to said circuit interruption means and to said supply network for sensing when the supply voltage has been restored and for actuating said circuit interruption means to reconnect the supply network and the load at a first predetermined time delay after said supply voltage has been restored, said sensing means comprising a delay circuit comprising a threshold device wherein the threshold device provides and activating signal to said circuit interruption means to reconnect said supply network and load at said first predetermined time delay after said supply voltage has been restored when the supply voltage has been restored for a preset period of time corresponding to said predetermined time delay.

2. The apparatus recited in claim 1, wherein said circuit interruption means comprises first switching means responsive to said activating signal.

3. The apparatus recited in claim 2, wherein said delay circuit further comprises second switching means for providing said activating signal to said first switching means.

4. The apparatus recited in claim 2, further comprising means for holding said first switching means in a conductive condition for a brief delay time greater than a momentary interruption of said supply voltage.

5. The apparatus recited in claim 4, further comprising means for minimizing power usage by said first switching means after said first switching means is placed in a conductive condition.

6. The apparatus recited in claim 5, wherein said means for minimizing power usage further comprises means for minimizing power usage by said second switching means.

7. The apparatus recited in claim 4, wherein said first switching means comprises first contact means operated by an energizing coil responsive to said activating signal.

8. The apparatus recited in claim 7, wherein said second switching means comprises second contact means coupled to said energizing coil of said first contact means for providing said activating signal to said first contact means.

9. The apparatus recited in claim 3, wherein said delay circuit comprises a first resistor-capacitor time constant circuit and a trigger device coupled to said time constant circuit.

10. The apparatus recited in claim 9, wherein said second switching means is actuated by said trigger device.

11. The apparatus recited in claim 7, wherein said means for holding comprises a latch for preventing movement of said first contact means when said first contact means are in a conductive condition, said latch comprising a delay means for preventing deenergization of the latch during a momentary interruption of the supply voltage.

12. The apparatus recited in claim 11 wherein said first contact means comprises an armature and further comprising a solenoid for moving said latch into engagement with said armature and wherein said delay means is coupled to said latch for delaying movement of said latch away from said armature during a momentary interruption of said supply voltage.

13. The apparatus recited in claim 12, wherein said delay means comprises a dashpot.

14. The apparatus recited in claim 8, further comprising means for deenergizing the energizing coil actuating said first contact means and the energizing coil actuating said second contact means after a further delay time greater than said first predetermined time delay.

15. The apparatus recited in claim 14, wherein said means for deenergizing comprises a second delay circuit coupled to the supply network and to said first delay circuit for deenergizing the energizing coil actuating said second contact means after said further delay time, thereby opening said second contact mean and deenergizing the energizing coil actuating said first contact means, said first contact means being maintained in a conductive condition by said holding means, said holding means further comprising means for holding said first contact means in a conductive condition when said supply voltage is present.

16. The apparatus recited in claim 15, wherein said second delay circuit comprises a second resistor-capacitor time constant circuit.

17. The apparatus recited in claim 7, wherein said first switching means comprises a latching coil and an unlatching coil, the latching coil being responsive to said sensing means for placing said first contact means in a conductive condition, and wherein said holding means comprises a third delay circuit coupled to said unlatching coil for delaying energization of said unlatching coil and opening of said first contact means during a brief interruption of said supply voltage.

18. The apparatus recited in claim 17, further comprising means coupled across said load for detecting an interruption of said supply voltage and for providing an actuating signal from said third delay circuit to said unlatching coil after a time delay determined by said third delay circuit, thereby opening said first contact means after an interruption of power for longer than the time delay determined by said third delay circuit.

19. The apparatus recited in claim 18, wherein said third delay circuit comprises a third resistor-capacitor time constant circuit.

20. The apparatus recited in claim 18, wherein said detecting means comprises relay means having contacts, and further comprising a power source connected across said third delay circuit by said contacts, and further comprising a trigger device coupled to said third delay circuit for actuating said unlatching coil when a trigger voltage of the trigger device has been attained by said third delay circuit.

21. The apparatus recited in claim 20, wherein said power source comprises a battery and wherein said first switching means includes additional contact means coupling said unlatching coil to said third delay circuit for disconnecting said unlatching coil from said battery when said first contact means open.

22. A method for delaying the connection of a supply network to an electrical load when the supply voltage from the network has been restored after a supply voltage interruption or reduction comprising:
   interrupting the circuit between the supply network and the load when the supply voltage has been interrupted or reduced; and
   sensing when the supply voltage has been restored and automatically actuating a circuit interruption device to reconnect the supply network and the load at a first predetermined time delay after the supply voltage has been restored, said step of sensing comprising providing an activating signal from a threshold device to reconnect the circuit between the electrical supply network and the electrical load at said first predetermined time delay after the supply voltage has been restored when the supply voltage has been restored for a preset period of time corresponding to said predetermined time delay.

23. The method recited in claim 22, further comprising preventing disconnection of the supply network and the load during a momentary interruption of the supply voltage less than a predetermined brief delay time.

24. The method recited in claim 22, further comprising minimizing power usage by said circuit interruption device after said circuit interruption device is placed in a conductive condition.

* * * * *